United States Patent [19]
Berg

[11] 4,437,849
[45] Mar. 20, 1984

[54] REPLACEMENT DRIVE BELT
[75] Inventor: Winfred M. Berg, East Rockaway, N.Y.
[73] Assignee: Winfred M. Berg, Inc., East Rockaway, N.Y.
[21] Appl. No.: 47,716
[22] Filed: Jun. 12, 1979
[51] Int. Cl.³ .............................................. F16G 7/00
[52] U.S. Cl. ................................. 474/256; 24/31 W; 198/812; 198/844; 198/847
[58] Field of Search ............... 24/16 PB, 19, 20 TT, 24/31 W, 255 SL, 38; 74/231 J, 234, 237, 231 P; 474/256, 255, 254, 253; 198/812, 844, 847

[56] References Cited
U.S. PATENT DOCUMENTS

| | | | |
|---|---|---|---|
| 2,300,706 | 11/1942 | Schott | 474/256 |
| 3,514,815 | 6/1970 | Evans | 24/16 PB |
| 3,518,727 | 7/1970 | Eberle et al. | 24/16 PB |
| 3,553,793 | 1/1971 | Long et al. | 24/16 PB |
| 3,653,099 | 4/1972 | Hoffman | 24/16 PB |
| 3,744,095 | 7/1973 | Tomlinson | 474/255 |
| 3,748,699 | 7/1973 | Cunningham | 74/231 J X |
| 3,837,047 | 9/1974 | Bunnell | 24/16 PB |
| 3,913,187 | 10/1975 | Okuda | 24/255 SL |
| 4,031,766 | 6/1977 | Beck | 474/256 |
| 4,183,120 | 1/1980 | Thorne | 24/255 SL |

*Primary Examiner*—Allan D. Herrmann
*Attorney, Agent, or Firm*—Holland, Armstrong, Wilkie & Previto

[57] ABSTRACT

A belt is described for use as an emergency replacement for a regular drive or timing belt. The belt comprises an elongated flexible member which has an integral ratchet type connecting means provided on its opposite ends. The flexible member is cut to form a loop of the desired size and the opposite ends are then connected using the ratchet connecting means without requiring any special additional connecting members or tools. The belt is useful, for example, in automobiles as an emergency replacement for the conventional fan belt or other engine belts where a belt fails in use and where the replacement belt permits the motorist to drive a sufficient distance to reach a garage for a regular belt replacement.

15 Claims, 12 Drawing Figures

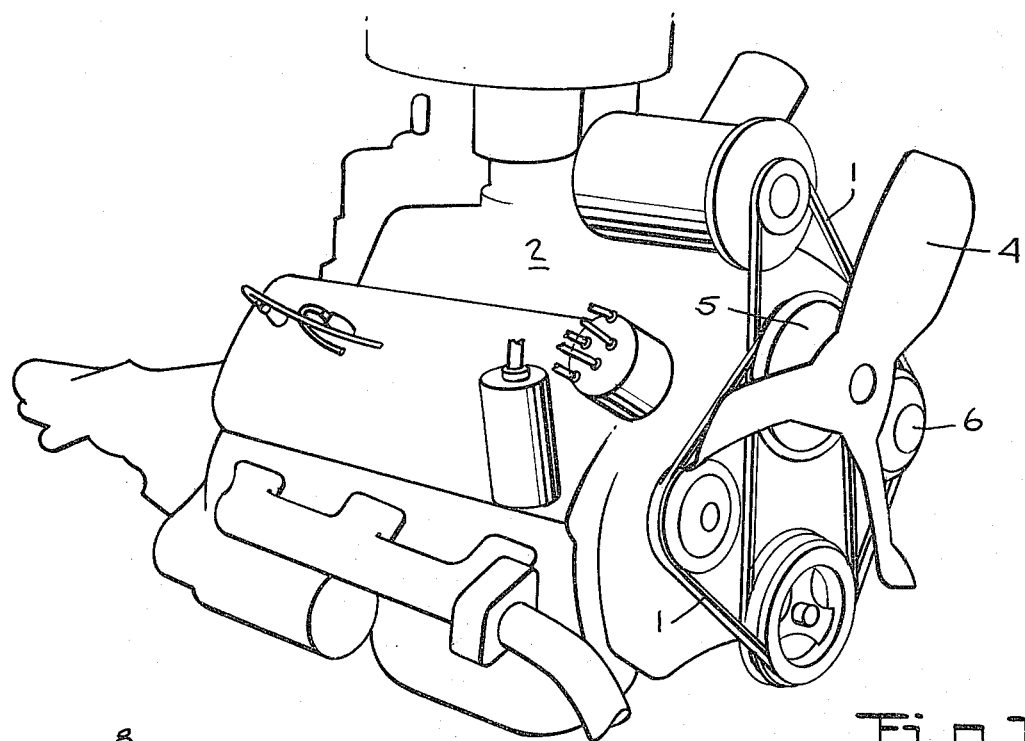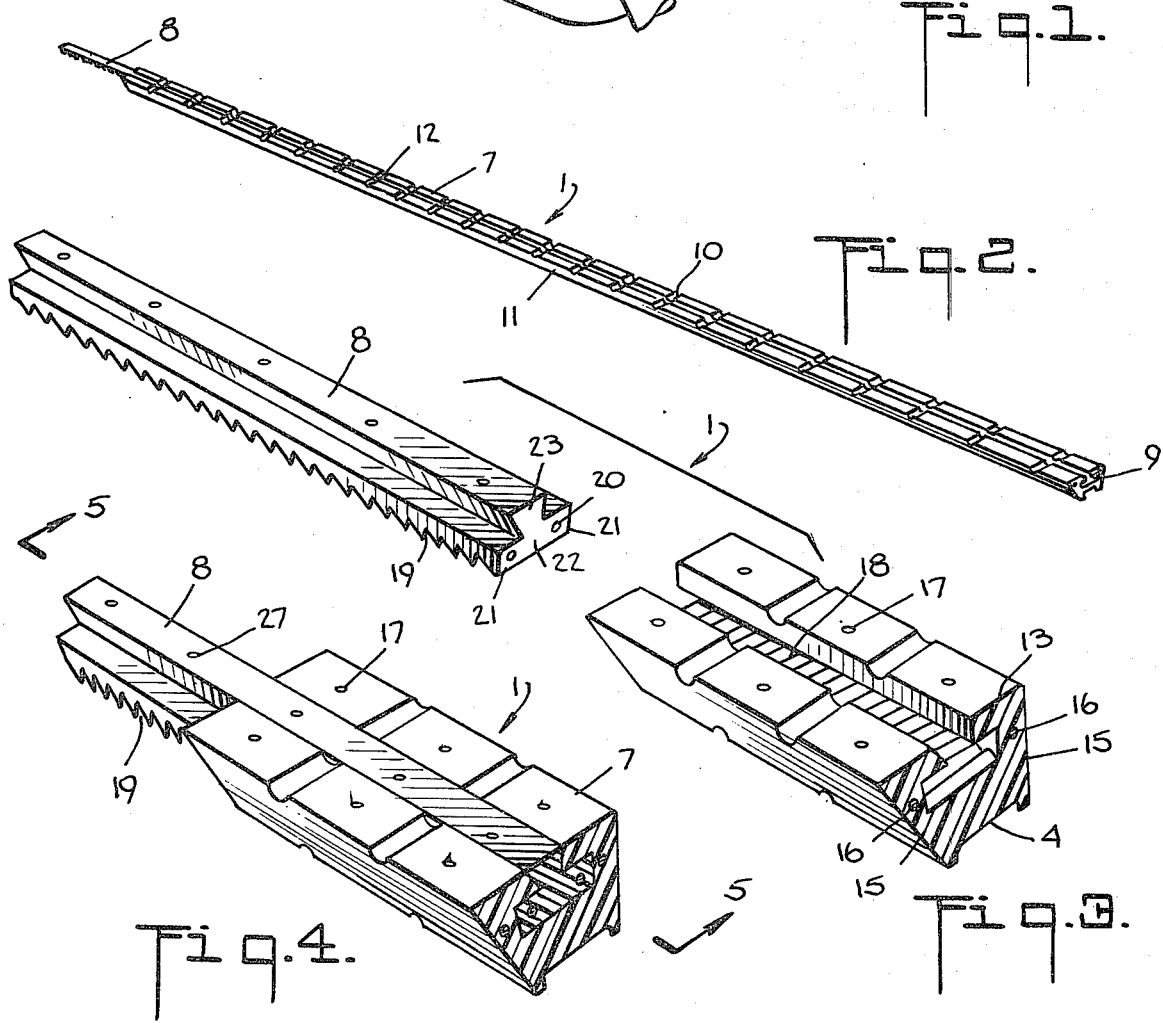

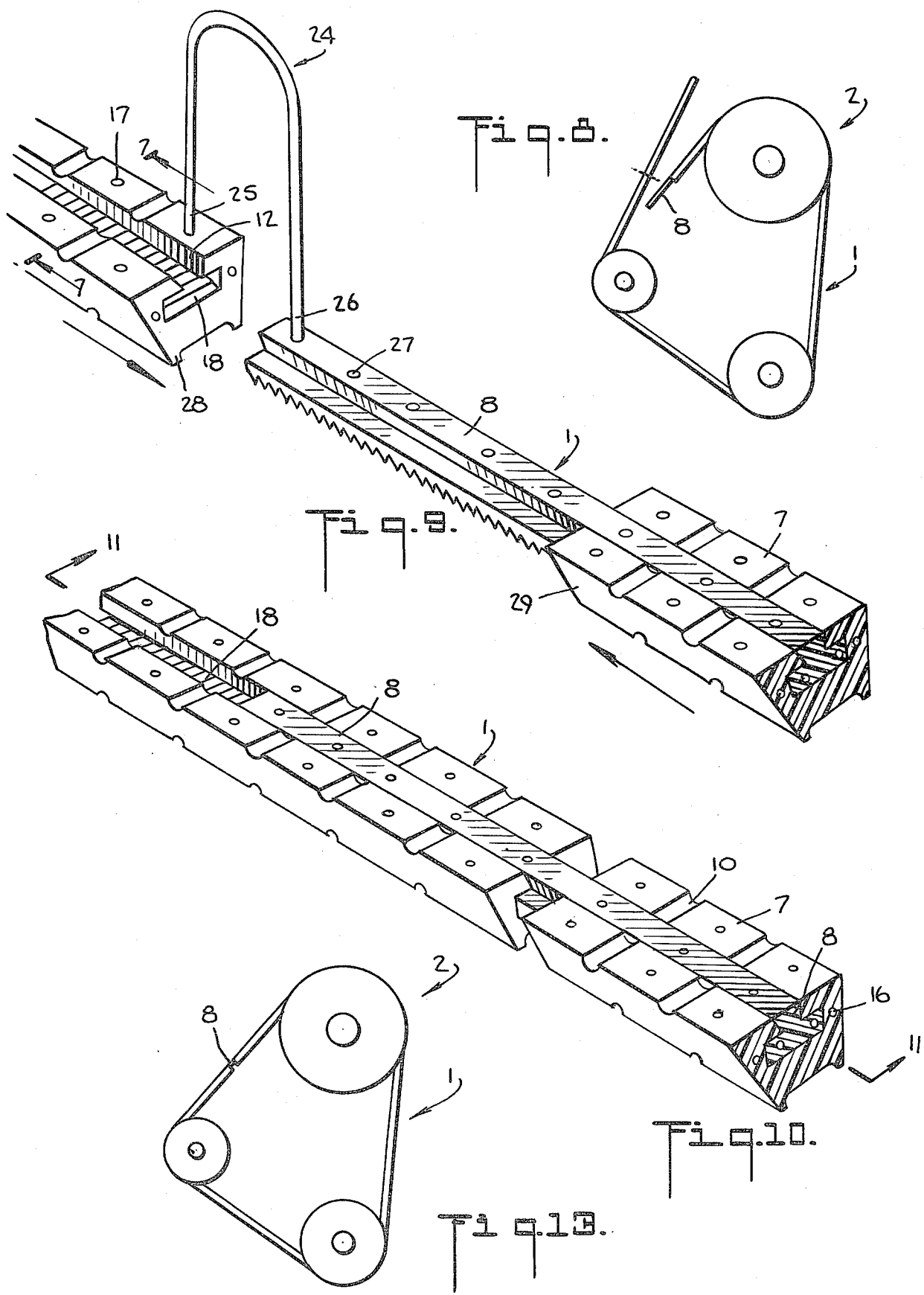

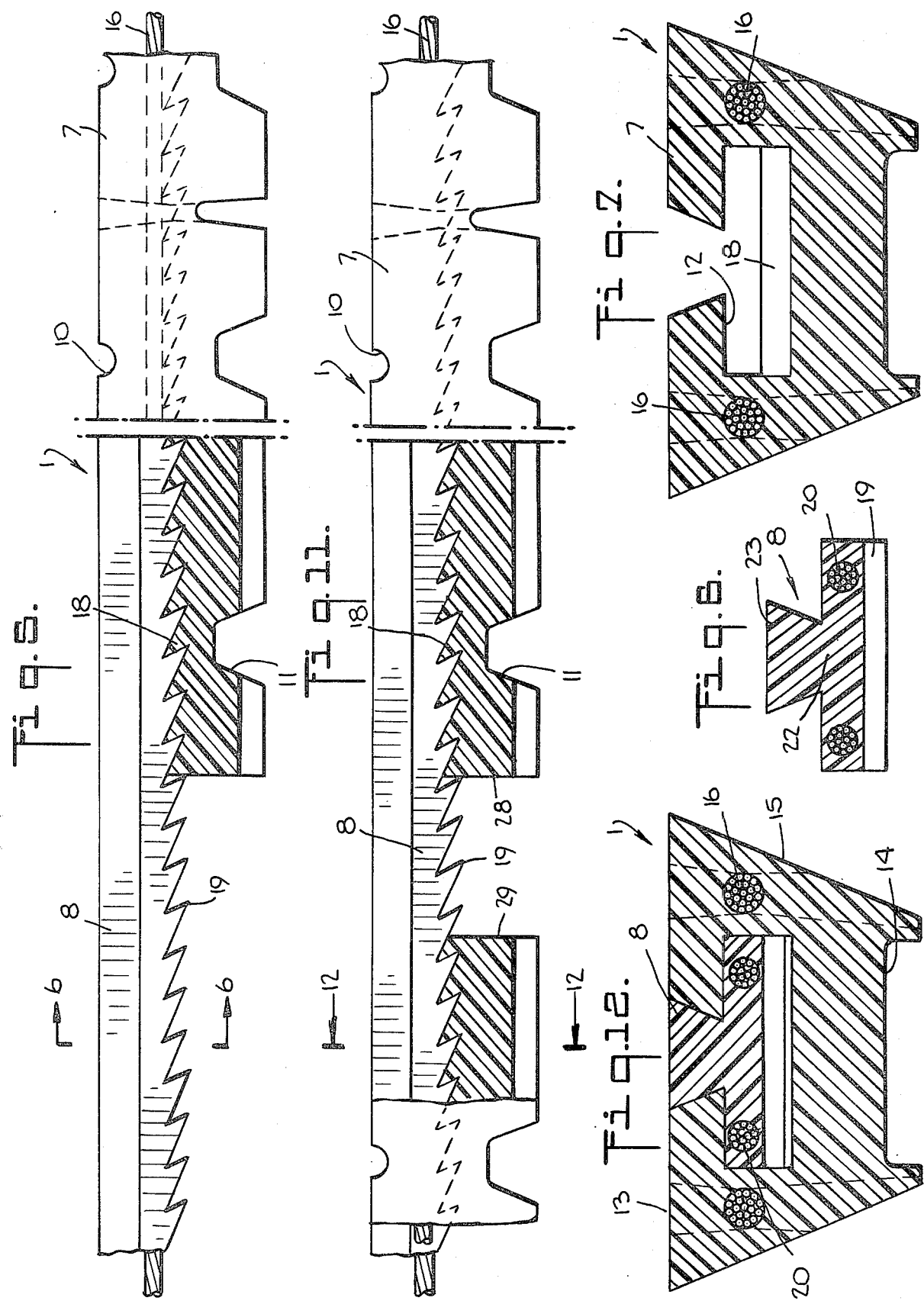

REPLACEMENT DRIVE BELT

BACKGROUND OF THE INVENTION

The present invention relates to drive or timing belts and more particularly to a replacement belt which may be kept available as an emergency replacement and which may be easily fitted into place when needed without any special skill or tools as a temporary replacement.

Automobiles as well as other vehicles, machines, or tools regularly utilize flexible drive belts for connecting portions of their drive systems. A failure of those drive belts usually results in a breakdown of the vehicle or machine. For example, a failure of a fan belt in an automobile results in the failure of the connected water pump and cooling fans so that the engine overheats and must be shut down. Other similar drive belts are used on vehicle generators and power steering units for providing these important auxiliary functions in vehicles and making vehicle use without the belts difficult and usually impossible. Other mechanical systems including machine tools and refrigerating systems and the like also include essential drive belts which fail from time to time and which when they do fail cause serious problems until they are replaced.

The function of the belt of the present invention is to provide an emergency replacement belt which is easily installed in the proper size for a particular use without requiring any special tools or expertise and without requiring any change in the alignment of the pulleys or other machine parts. Normally, for example, when an automobile pump and fan belt breaks, it is necessary to stop the vehicle and to acquire a similar replacement belt which may be both time consuming and difficult and which may be impossible in certain places or times of day. A belt in accordance with the present invention, is carried in the vehicle or otherwise kept available in a length great enough for the largest belt which may require replacement. Should the belt fail, it is only necessary to cut the replacement belt of the invention to the necessary loop length and to connect the belt ends using the integral connector or coupling provided.

Accordingly, an object of the present invention is to provide an improved emergency replacement drive or timing belt for engines or other machines or apparatus.

Another object of the present invention is to provide an emergency replacement belt which will fit a variety of belt sizes and which is easily applied without any special tools or engine part adjustments.

Another object of the present invention is to provide an improved coupling means for connecting the opposite ends of a length of belting to form a closed loop.

Other and further objects of the present invention will become apparent upon an understanding of the illustrative embodiments about to be described, or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification wherein:

FIG. 1 is a perspective view illustrating belts in accordance with the invention used on a typical vehicle engine.

FIG. 2 is a perspective view of a preferred embodiment of the replacement belt of the invention.

FIG. 3 is an exploded perspective illustrating the ratchet tie or coupling means provided at one end of the belt in accordance with the present invention.

FIG. 4 is an enlarged perspective view of the ratchet tie of FIG. 3 in position on the belt end.

FIG. 5 is a longitudinal sectional view of the belt end of FIG. 4 taken along line 5—5 on FIG. 4.

FIG. 6 is a lateral sectional view of the ratchet tie taken along line 6—6 on FIG. 5.

FIG. 7 is a lateral sectional view of the belt taken along line 7—7 on FIG. 9.

FIG. 8 is a diagrammatic illustration, illustrating an initial step in installing the belt of the invention on a number of pulleys.

FIG. 9 is an enlarged perspective view illustrating the attachment of opposite ends of the length of belt in accordance with the invention to form a closed loop and illustrating the use of an optional tool for facilitating the attachment.

FIG. 10 is an enlarged perspective view corresponding to FIG. 9 showing the completed coupling of the opposite ends of the belt to form a loop.

FIG. 11 is a longitudinal sectional view of the coupling taken along line 11—11 on FIG. 10.

FIG. 12 is a lateral sectional view of the completed coupling taken along line 12—12 on FIG. 11.

DESCRIPTION OF THE PREFERRED EMBODIMENT

While many differing designs of flexible belts are in use for driving and timing purposes, such belts are normally provided for use in the form of closed loops in particular sizes. Because these belts must tightly couple the connected pulleys, it is difficult if not impossible to readily fit the closed loops over the drive pulleys without substantial adjustment of the position of at least one of the driven pulleys. This makes the replacement of such belts difficult in emergency situations or in the field even though a belt of the correct length might be available. Additionally, where vehicle or machine use requires belts of a variety of differing sizes, the provision of replacement belts of all sizes becomes expensive and impractical. These problems are overcome by the replacement belt of this invention by the provision of a length of replacement belting sufficiently long for all uses and having a reliable and easily manipulated coupling for forming an effective loop after the belt has been cut to size. In addition, and as will be clear from the following description, it is desirable that the belt sizing and coupling into a loop be done without any particular tools and using only a sharp knife or razor to fix the loop size.

FIG. 1 shows a pair of drive belts 1 in accordance with the invention utilized on a vehicle engine 2. These include the first belt 1 for driving the engine cooling fan 4 and a water pump pulley 5 and a second belt 1 for driving additional auxiliary elements such as a generator or a power steering unit 6. The replacement belts 1, in accordance with the invention, are cut to the correct length and wrapped around the engine 2 pulleys to form a loop without requiring a physical displacement of any of the driving or driven pulleys.

FIG. 2 illustrates the general form of a preferred embodiment of a belt 1 in accordance with the invention in the form of an elongated molded plastic body 7 with a ratchet tie 8 at one end adapted for securely engaging a cooperating ratchet means 9 on the opposite end of the belt 1. The belt 1 which will be described more fully below, includes spaced indents or grooves 10 and 11 for increased flexibility and a longitudinal channel 12 which cooperates with the ratchet means 9 and which further increases the flexibility of the molded plastic body 7. The body portion is preferably molded of polyurethane resin or a resin having similar properties.

The preferred design of the body portion 7 of the belt 1 is illustrated in greater detail in FIGS. 3, 5 and 7. The molded body portion 7 has a preferred cross section as shown at the right hand side of FIG. 3. The outer dimensions of the cross section correspond generally to the corresponding cross section of the drive belt to be replaced. For most applications and particularly for vehicular engine belts, this cross section comprises the usual V-belt form consisting of generally parallel upper and lower surfaces 13 and 14 connected by flared pulley engaging side surfaces 15. The molded body 7 in accordance with this invention, has its flexibility increased by the provision of the spaced lateral grooves 10 and 11 on both the upper and and lower surfaces of the belt body 7. Additionally, the preferred embodiment includes the longitudinal groove 12 in the upper belt surface for further increasing the belt flexibility and as used for loop forming as will be described below.

In order to strengthen the molded plastic belt 1 without any significant reduction of belt flexibility, reinforcing cables 16 are embedded longitudinally of the belt body 7 during the molding process. An adequate and preferred arrangement for the cables 16 comprises the use of a pair of cables 16 located on opposite sides of the belt body 7 as illustrated in FIG. 3 and other figures. The cables 16 are automatically embedded into the belt body 7 as the belt 1 is molded using conventional molding machines. The cables 16 may be formed of synthetic fibers such as braided and coated Kelvar or similar plastic cording or cable materials or the cables may be formed of steel having about 400 pounds test strength. In order to maintain the cables 16 in their proper position within the plastic body during the manufacture of the plastic body portion 7, vertical apertures 17, which accommodate accomodate cable centering means are formed and remain in the plastic cable body 7.

THE RATCHET TIE OR CONNECTOR

In order to assure that the belt is practical and is useful for replacement and particularly for emergency replacement use by motorists or others, the lengths of cable must be easily and effectively mounted on the connected pulleys without the use of special tools and without requiring a repositioning of any of the driven pulleys. An improved and effective connector is provided for this purpose. As illustrated in FIGS. 3 and 4, the connector includes the separately formed tongue or ratchet tie 8 having a generally T-shaped cross section which is complimentary to the above described longitudinal channel 12 in the belt top. The longitudinal channel 12 in the belt 1 is formed with continuous ratchet teeth 18 projecting upwardly from the bottom of the channel 12 so that they interlock with cooperating and complementary ratchet teeth 19 formed on the bottom surface of the ratchet tie 8. The ratchet tie 8 is attached to the belt 1 body 7 by having one end inserted into the channel 12 in one end of the belt with the ratchet teeth 18 and 19 interlocking and with the cross section of the ratchet tie closely fitting the channel 12 cross section as illustrated in FIGS. 4 and 5.

After the ratchet tie 8 is inserted into the belt 1 in the position illustrated in FIGS. 4 and 5, the ratchet tie 8 is preferably fastened to the plastic belt body 7 using suitable plastic cement or ultrasonic sealing. Preferably, the ratchet tie 8 is also reinforced with embedded plastic or steel cables 20 extending along the lateral flanges 21 of the ratchet tie 8 and embedded therein during the molding of the ratchet ties 8 which are molded in indeterminate lengths and which are then cut to the desired short sections described above. A preferred cross section for the ratchet tie 8, as seen in FIG. 3, has a generally rectangular lower body portion 22 with the ratchet teeth 19 on its under surface and with an upwardly extending longitudinal flange 23 having flared side walls shaped to engage the correspondingly flared side walls of the cooperating portion of the channel 12 in the belt 1.

In order that the lengths of the belt 1 made available for emergency use may be formed into loops of the desired size, it is necessary that the belt material be furnished sufficiently long enough to be cut to the appropriate length when required and that this cut be made without effecting the connecting operation of the ratchet tie 8. This is accomplished by forming the longitudinal channel 12 in the belt throughout its entire length and by including the upwarely facing ratchet teeth 18 throughout the entire length of the channel 12. Since a preferred method of manufacturing the belt material is a molding process, the continuous channel 12 together with the continuous ratchet teeth 18 are readily provided.

When a belt 1 is to be used on a particular pulley arrangement, the belt material is first cut to the proper length using a knife or razor. This sizing of the belt is done while taking into account that a small space is desirable between the adjacent ends of the completed loop so that the ends of the belt may be tightly fastened with the desired degree of the belt tension without interference between the adjacent belt ends. The connection or fastening to form a loop is illustrated in FIGS. 8 through 13. After the belt has been measured and cut to the desired length for the loop in the manner illustrated in FIG. 8, the ratchet tie 8 is inserted into the cooperating channel 12 in the opposite or cut end of the belt 1 in the manner shown in the FIGS. 9, 10 and 11 with the ratchet teeth 19 of the ratchet tie 8 engaging the cooperating teeth 18 in the belt channel 12. Due to the relatively large number of teeth and their fine pitch, it is possible to make a continuous and fine adjustment as the belt ends are drawn together and to eliminate all slack between the belt ends so that the belt tightly engages the connected pulleys in forming a replacement drive as illustrated in FIG. 13.

This connection may be made without requiring any coupling tools or other aids. Alternatively, it is possible to employ a simple tool for performing the final tightening of the belt. Such a simple tool is illustrated in FIG. 9, comprising a generally U-shaped, rod-like tool 24, adapted to have one leg 25 inserted into a centering hole 17 on the belt 1 and the end of the opposite leg 26 inserted in a hole 27 formed in the ratchet tie 8 as it was molded or in an adjacent hole 17 on the belt 1. The legs 25 and 26 are then squeezed toward one another. FIG. 11 illustrates the completed connection and shows a slight gap between the ends 28 and 29 of the connected belt material. This gap which is useful but not essential, permits the tightening to be completed initially as far as possible and permits a possible further tightening after the belt 1 has been tested in use. When the belt 1 is cut for the formation of the loop, the provision of this slight gap is also desirable to prevent a premature abutting of the belt ends which would make the initial or corrective tightening without a further cut. The ratchet tie 8 being reinforced with one or more of the cables 20 is strong and flexible and is capable of transmitting the drive forces present in the mounted belt 1.

It will be seen that an effective and simple replacement drive belt has been provided which is readily mounted when required for belt loops of differing lengths and without the need of any special tool and without requiring the connected pulleys to have their positions adjusted. The replacement belt is inexpensively and effectively manufactured from plastic by known molding techniques and is both flexible and strong so that it meets the requirements of convenience and suitability.

As various changes may be made in the form, construction and arrangement of the parts herein without sacrificing any of its advantages, it is to be understood that all matter herein is to be interpreted as illustrative and not in a limiting sense.

What is claimed is:

1. A replacement drive belt comprising an elongated belt portion of indeterminate length adapted for being cut adjacent to one end for forming loops of varying sizes and having coupling means for connecting its opposite ends, said coupling means comprising a first elongated ratchet tie having immediately adjacent ratchet teeth and extending from the belt end opposite to said cut end and adapted to adjustably engage and to form a connection with second ratchet teeth positioned immediately adjacent to each other and extending along said belt from the cut end.

2. The drive belt as claimed in claim 1 in which a channel extends along the entire upper portion of the elongated belt portion and said second ratchet teeth are positioned in said channel.

3. The drive belt as claimed in claim 2 in which said ratchet tie has one end positioned in said channel with the first ratchet teeth on said ratchet tie engaging the second ratchet teeth in said channel.

4. The drive belt as claimed in claim 3 in which said ratchet tie has fastening means in addition to said ratchet teeth connecting the ratchet tie to the belt portion.

5. The drive belt as claimed in claim 2 in which said channel has an inverted T-shaped cross section and said ratchet tie has a complimentary T-shaped cross section of similar size whereby said ratchet tie tightly fits within said channel.

6. The drive belt as claimed in claim 1 in which said belt portion further comprises one or more embedded cables extending longitudinally of the belt portion.

7. The drive belt as claimed in claim 1 in which said ratchet tie further comprises one or more embedded cables extending longitudinally of said ratchet tie.

8. The drive belt as claimed in claim 1 in which said belt portion comprises polyurethane.

9. The drive belt as claimed in claim 1 in which said ratchet tie comprises polyurethane.

10. The drive belt as claimed in claim 6 in which said cable comprises plastic.

11. The drive belt as claimed in claim 6 in which said cable comprises steel.

12. The drive belt as claimed in claim 7 in which said cable comprises steel.

13. The drive belt as claimed in claim 1 in which said belt portion includes lateral cable centering apertures.

14. The drive belt as claimed in claim 7 in which said belt portion includes lateral cable centering apertures.

15. The drive belt as claimed in claim 1 in which said belt portion and ratchet tie each includes longitudinally spaced apertures.

* * * * *